3,330,794
COPOLYMER OF AN EPOXIDIZED OLEFIN AND A NON-CONJUGATED DIENE
George Arthur Gallagher, Media, Pa., assignor to E. I. du Pont de Nemours and Company, Wilmington, Del., a corporation of Delaware
No Drawing. Filed Feb. 3, 1965, Ser. No. 430,170
8 Claims. (Cl. 260—29.3)

This invention relates to new epoxidized copolymers and adhesive compositions and their use for bonding α-olefin hydrocarbon polymers to selected materials.

Sulfur-curable, chain-saturated α-olefin hydrocarbon polymers (for example, copolymers of ethylene, propylene and non-conjugated dienes) are acquiring increasing importance today in the manufacture of a wide variety of useful products. Applications such as tires, indusrtial belts, tarpaulins and the like require that the polymers be bonded to substrate materials such as nylon and rayon.

The adhesives currently available for bonding these polymers to substrates of this type have not been entirely satisfactory. For example, the customary tire cord dips have provided inadequate bonding. Better results have been obtained by applying an organic solvent solution of selected adhesives over the coated cords, but this procedure is economically undesirable. The handling and recovery of the volatile organic solvents used in the coating require extra plant investment and high operating expense. For reasons of both operating safety and economy, many plants are only equipped at present to use aqueous dispersions.

It has unexpectedly been found that a sulfur-curable, chain saturated, α-olefin hydrocarbon copolymer can be firmly adhered to a polyamide or cellulosic substrate by coating the substrate with an aqueous dispersion containing (a) an epoxidized α-olefin/non-conjugated diene copolymer having at least about 0.3 gram-mole oxirane groups per kilogram of copolymer and at least about 0.3 gram-mole carbon-carbon double bonds per kilogram of copolymer and (b) a resorcinol-formaldehyde type resin, drying the coating material, and curing the hydrocarbon copolymer while pressing it in contact with the coated substrate.

An advantage of the present invention is the flexibility of application procedures. Those skilled in the art can select the most convenient method from several alternatives. For example, the substrate can be coated in turn with the resorcinol formaldehyde resin and the epoxidized copolymer; it can be given a single coat containing both of these components; or it can be coated sequentially with the resin and then a mixture of resin and epoxidized copolymer. After the coating has been dried by removing the water, as mentioned above, the substrate is ready for bonding to the α-olefin hydrocarbon polymer with heat and pressure.

The substrates being bonded to the α-olefin hydrocarbon polymers include the normally solid polyamide and cellulosic substrates. In a particularly valuable application of the present invention, these materials are in the form of woven fabrics, tire cords, filaments, spun fibers or blends thereof. Representative examples are the industrial fibers such as nylon, cotton, and rayon.

The sulfur-curable, chain-saturated α-olefin hydrocarbon copolymer to be bonded to the aforementioned substrates is generally a copolymer of at least one α-mono-olefin having the structure R—CH=CH$_2$ wherein R is hydrogen or alkyl of 1 to 16 carbon atoms (e.g., ethylene, propylene, 1-hexene), with at least one non-conjugated hydrocarbon diene. Representative copolymers include ethylene/propylene/1,4-hexadiene; ethylene/1,4 - hexadiene; ethylene/propylene/dicyclopentadiene; ethylene/propylene/5 - methylene - 2 - norbornene; and ethylene/propylene/1,5 - cyclooctadiene. Other suitable monomers, copolymers and preparations are disclosed in U.S. Patents 2,933,480; 3,000,866; 3,063,973; 3,093,620; 3,093,621 and Belgian Patent 623,698.

Before being adhered by the composition of the present invention, these sulfur curable copolymers are generally compounded with a curing system, and optional components such as mineral fillers, carbon black, petroleum oil, pigments, antioxidants, and other materials. A preferred curing system includes sulfur, activators such as zinc oxide, and the conventional accelerators such as are described in the above-listed U.S. patents.

An important component of the novel adhesive composition is the epoxidized α-olefin/non-conjugated diene copolymer. In general, this class of new materials is made by conventional oxidation of the side chain carbon-carbon double bonds of α-monoolefin/non-conjugated diene copolymers with organic peracids such as perbenzoic acid and peracetic acid. An important feature of this invention is that the resultant polymers contain both oxirane groups and residual unsaturation. The latter is particularly important if the composite article is to be used at elevated temperatures. The otpimum amount of oxirane groups and of residual unsaturation will vary somewhat depending on what α-olefin/nonconjugated diene copolymer is used as a base for making the peroxidized adhesive. It is very important that this copolymer be so chosen as to permit the incorporation of sufficient oxirane groups to provide good room temperature adhesion while still allowing sufficient residual unsaturation to provide good high temperature adhesion. Those skilled in the art can determined by a few empirical experiments whether or not a given α-olefin/diene copolymer is suitable. In general it has been found that the copolymer should be so chosen as to give an epoxidized adhesive containing at least 0.3 gram mole of oxirane groups and at least 0.3 gram mole of carbon to carbon double bonds/kilogram of polymer.

Polymers suitable for epoxidation and formation of adhesive compositions include copolymers of ethylene with non-conjugated hydrocarbon dienes of 6–22 carbon atoms; suggested dienes include dicyclopentadiene, 1,5-cyclooctadiene, and 5-methylene-2-norbornene. They can be made in accordance with the general procedures disclosed in U.S. Patents 2,933,480; 3,000,866; 3,063,973; 3,093,620; 3,093,621; and Belgian Patent 623,698. The most preferred copolymers include those containing at least 50% ethylene monomer units by weight. One class of polymers has endocyclic monomer units, some of which may contain residual sulfur-curable unsaturation; representative examples being ethylene/propylene/dicyclopentadiene and those set out in Canadian Patent 607,108.

Another preferred class is the ethylene/1,4-hexadiene copolymers having about 55% or more incorporated ethylene monomer units by weight. A preferred representative copolymer is made by copolymerizing ethylene and 1,4-hexadiene in tetrachloroethylene with a vanadium tris(acetyl acetonate)/diisobutyl aluminum monochloride catalyst according to the general procedures of U.S. Patent 2,933,480. This copolymer has about 3 moles of carbon-carbon double bonds per kilogram of copolymer.

Excellent adhesives are obtained from compositions wherein as little as 10% and as much as 90% of these unsaturated units have been epoxidized. No gross change occurs in the copolymer property after epoxidation; the solution viscosity remains substantially unaltered. The epoxidized copolymer is stable and can be stored at ambient conditions of temperature and humidity for a month or more.

In addition to the use already mentioned, these epoxidized copolymers have also been found valuable as metal adhesives, wax fillers and also form hard, transparent coatings on hydrophilic substances as glass.

The reaction of olefinic compounds with organic peracids to form epoxy compounds is described more particularly in Organic Reactions, vol. 7, John Wiley & Sons, Inc., New York, pages 378–433 (1953); Chemical Reviews, vol. 45, page 1 et seq. (1949); Organic Synthesis, Coll. vol. I, John Wiley & Sons, Inc., New York, pages 431–434, 494 (1958); Organic Synthesis, vol. 38, John Wiley & Sons, Inc., New York, page 83; Mechanism and Structure in Organic Chemistry, E. S. Gould, Henry Holt & Co., New York, page 534 (1959); Heterocyclic Compounds, vol. I, Ed. by R. C. Elderfield, John Wiley & Sons, Inc., New York, pages 1–6 (1950); Methoden der Organischen Chemie, Vierte Auflage, Sauerstoff, vol. III, Houben-Weyle, George Thieme Verlag, Stuttgart, pages 40, 68 (1952) and Analytische Methoden, vol. II, pages 308–309, 428–433 (1953); Organic Analysis, vol. I, Interscience Publishers, Inc., New York, pages 127–154 (1953).

Suitable latexes are prepared from organic solutions of the epoxidized copolymer in the conventional manner. Typically, the copolymer solution is mixed with water containing an emulsifying agent; removal of the organic solvent from the resulting emulsion gives the latex. Representative solvents include aliphatic and aromatic hydrocarbons (e.g., hexane, cyclohexane, benzene, toluene) and halogenated aliphatic and aromatic hydrocarbons (e.g., carbon tetrachloride, 1,1,1-trichloroethane, and tetrachloroethylene). Water soluble organic emulsifying agents, or mixtures thereof which will give oil-in-water emulsions are used. The term "oil-in-water" emulsifying agents is well understood by those skilled in the art and is set out in detail in the book "Surface Active Agents," Swartz and Perry, Interscience Publishers, Inc. (1949) pages 9–12, 54, 116–120. Typical anionic emulsifying agents are the sodium salts of long-chain alkyl-substituted aryl sulfonic acids or long chain alkyl sulfonic acids or long-chain alkyl hydrogen sulfates or long-chain carboxylic acids. Representative non-ionic agents include mono- (and di-) long-chain alkyl ethers of polyethylene ether glycol. A particularly preferred procedure involves the use of a minor proportion of an emulsification modifier, soluble in both the aqueous and the oil phase. A preferred example is isopropanol; alternatives include methanol, ethanol and acetone. The modifier is introduced prior to the formation of the latex; it is preferably added to the oil phase but may be in either or both. Those skilled in the art can determine the optimum amount to employ for a particular system. If too little modifier is employed, the resultant latex may not have as fine a particle size as desired. Excessive proportions of modifier may lead to coagulum formation or separation of the organic solvent. A typical concentration in water is 30 volume percent.

The phenol-aldehyde type resin solution which is the other important component of the adhesive composition, is preferably made by reacting formaldehyde (or materials furnishing formaldehyde such as paraformaldehyde), with a phenolic component, e.g., a dihydroxybenzene such as resorcinol which is preferred. Such resins can be made by procedures familiar to those skilled in the art. The relative proportion of aldehyde to phenolic component can be varied. In representative procedures about 0.7 to 2 moles of formaldehyde have been supplied for each mole of resorcinol. The reaction is catalyzed by both acid and base. Generally, the condensation is carried out under basic conditions, e.g., at a pH in the range 8–9 in the presence of a strongly basic material such as an alkali metal hydroxide. However, resins made under slightly acidic conditions, e.g., pH 3–4 are also suitable. If the resin solution is made at a pH below 7, it is preferably made alkaline (e.g., with NaOH or ZnO) before use. The mixture of resorcinol, formaldehyde, and catalyst is usually allowed to react at a temperature of about 25° C., but higher temperatures may be employed to hasten the reaction if desired. The time needed to carry out the condensation can be determined by routine experimentation.

The relative proportion of the epoxidized copolymer and the resin in the adhesive can be varied quite widely to suit the needs of the particular application. In a representative adhesive composition about six portions of the epoxidized ethylene/1,4-hexadiene copolymer have been employed for every proportion by weight of a formaldehyde/resorcinol type resin.

In addition to these two components other optional components can be employed if desired. Thus, the styrene/1,3-butadiene/2-vinyl pyridine copolymer latex conventionally used in the trade for tire cord dipping appplications can be used. In typical operations about 25–75% of the latex solids is supplied by the vinyl pyridine terpolymer. If desired, the styrene/1,3-butadiene/2-vinyl pyridine terpolymer latex can be mixed with a resorcinol/formaldehyde dispersion in water and the resorcinol/formaldehyde resin formed thereafter in the presence of the terpolymer.

In the first step in making composite articles with the adhesive composition, the substrate (e.g., the fabric) is coated with the aqueous adhesive composition. This composition may be applied in any manner desired, such as by dipping, painting, spraying or by roller coating. The coating is then dried at an elevated temperature such as 135° C. The amount of adhesive applied is not particularly critical; representative amounts range from about 5 to 15% by weight of the fabric. Generally speaking, 5–7% is sufficient to give strong bonds. Less may be applied, but the adhesion will tend to decline. Addition of higher amounts is wasteful and may, if carried too far, cause the adhesion to be less than the optimum desired.

Alternatively, as mentioned above, the substrate is first coated with an aqueous composition containing the resin and optionally the vinyl pyridine terpolymer. After the first coating has dried, the adhesive composition containing the epoxidized copolymer is applied. For reasons of operating convenience it is sometimes preferred to use the procedure described in the above paragraph. However, slightly better adhesive bonding is obtained when the resin is applied as the first coat ahead of the epoxidized copolymer.

The adhered composite article is finally obtained by heating the curable assembly under pressure. Temperatures generally range between about 130–160° C. with about 150° C. and 160° C. being preferred. Cure times are not critical and can range from between about 10 minutes and 2 hours without adverse effect on the adhesion obtained. The cure time will vary inversely with the temperature, higher temperatures requiring shorter cure times. Those skilled in the art will select the particular conditions needed for optimum results based on such considerations as the conditions recommended in the art for the particular curing agents being used, etc. During the cure, pressure may be applied as desired.

The invention will now be described with reference to the following examples of specific embodiments thereof wherein parts and percentages are by weight unless otherwise specified.

EXAMPLE 1

A. Preparation of ethylene 1,4-hexadiene copolymers

Ethylene and 1,4-hexadiene were copolymerized in tetrachloroethylene in the presence of a vanadium tris(acetylacetonate)/diisobutyl aluminum monochloride catalyst in accordance with the general procedures of U.S. Patent 2,933,480. The molar ratio of aluminum to vanadium was about 6:1. Two different copolymers were obtained. The rubber-like copolymer A contained 2.74 g.-moles of carbon-carbon double bonds per kliogram and exhibited an inherent viscosity of 1.5 (measured on a solution of 0.1 gram of copolymer in 100 ml. of tetrachloroethylene at 30° C.). Copolymer B contained 2.9 g.-mole unsaturation and had an inherent viscosity of 1.41.

B. Preparation of epoxidized copolymer

A solution of 30.6 grams (0.222 gram-mole) of perbenzoic acid in 483 ml. of chloroform was added with stirring to a solution of 108 grams of the ethylene/1,4-hexadiene copolymer A in 2,100 grams of carbon tetrachloride cooled by a water bath at 15–20° C. After agitation had been continued for one hour, the mixture was allowed to stand for 16–20 hours at 25–30° C. The epoxidized copolymer was precipitated by pouring this solution into a large volume of acetone at 25–30° C. After several acetone washings, the product was air dried. The white product obtained was easily soluble in carbon tetrachloride, contained 0.7 gram-mole of carbon-carbon double bonds per kilogram (as determined by bromine equivalent, and had 2.0 gram-moles per kilogram of oxirane oxygen. The following epoxidized copolymers were made by this general method, seven from copolymer A (i.e. A-1 to A-7), two from copolymer B (i.e., B-1 and B-2), and one from copolymers A and B combined ($A+B$).

TABLE 1

| Epoxidized Copolymer | Epoxidized Copolymer (Moles/kg.) | |
|---|---|---|
| | $-C\underset{O}{-\!-\!-}C-$ | $-C=C-$ |
| A-1 | 0.32 | 2.42 |
| A-2 | 0.74 | 2.00 |
| A-3 | 1.44 | 1.3 |
| A-4 | 1.46 | 1.28 |
| A-5 | 2.07 | 0.67 |
| A-6 | 2.49 | 0.35 |
| A-7 | 2.04 | 0.7 |
| B-1 | 1.3 | 1.6 |
| B-2 | 1.72 | 1.18 |
| A+B | 1.47 | 1.29 |

C. Preparation of aqueous polymer latex

In an Osterizer (or Waring) type blendor were put 120 ml. of distilled water, 8.9 ml. of 1.0 N sodium hydroxide solution, and 40 ml. of isopropyl alcohol. The blendor was started and a solution of 25 grams of a partially epoxidized ethylene/1,4-hexadiene copolymer (of the type prepared above) and 2.5 grams of oleic acid in 260 ml. of carbon tetrachloride was added in a slow stream. Carbon tetrachloride and isopropyl alcohol were removed from the resulting emulsion at reduced pressure (final value 68 mm. Hg) on a 45–50° C. water bath. The aqueous latex obtained weighed 141 grams and contained 18.5% solids by weight.

D. Preparation of adhesive compositions

Two types of aqueous dispersions X and Y were prepared for use as adhesives. In each case an aqueous dispersion of a heat reactive resorcinol/formaldehyde type resin was prepared and allowed to age briefly at 25–30° C. Then an epoxidized copolymer latex and additional water were introduced. The resulting mixtures were allowed to age at 25–30° C. before being used. The following procedures were employed:

| | X | Y |
|---|---|---|
| Distilled Water | 55.6 ml. | 55.0 ml. |
| NaOH Solution (8.5 g./100 ml. water) | 4.4 ml. | |
| Resorcinol | 2.76 g. | 27.5 g. |
| 37% Formaldehyde Solution | 3.80 ml. | 14.0. |
| Age at 25–30° C | 6 hrs. | 1 hr. |
| | Adjust pH to 7.0 with NaOH solution (8.58 g./100 ml.) | |
| Add: | | |
| Epoxidized Polymer (as latex) | 25.6 g. | 37.3 g. |
| Water | 60–75 ml. | 125–200 ml. |
| Age before using | 4 hrs. | 4 days. |

E. Preparation of α-olefin hydrocarbon copolymer elastomers

A rubber-like ethylene/propylene/1,4-hexadiene copolymer is employed which is made in accordance with the general procedures of U.S. Patent 2,933,480. Representative samples of this copolymer contain about 42% propylene and 4% 1,4-hexadiene monomer units by weight and exhibit a Mooney viscosity (ML-4/250° F.) of about 70.

The elastomeric copolymer is compounded as follows on a rubber roll mill:

Component: Parts by weight
α-olefin hydrocarbon elastomer _____ 100
HAF carbon black _____ 50
Naphthenic petroleum oil _____ 20
Zinc oxide _____ 5
Tetramethylthiuram monosulfide _____ 1.5
2-mercaptobenzothiazol _____ 0.5
Sulfur _____ 1.0

Stocks to be used for strip adhesion tests are sheeted off the mill to give about an 80-mil thickness. Stocks to be used for "H-Pull" tests are sheeted off so as to give a thickness of 125 mls.

F. Adhesion of fabrics to α-olefin hydrocarbon copolymer elastomers

The nylon fabric substrate used was a plain weave with a count of 60 x 40 obtainable as style SN-7 from Wellington Sears, 111 W. 40th St., New York, N.Y. The filament rayon fabric substrate had a flat 2 x 1 weave with a count of 84 x 38 and is available as style S-76 from Wellington Sears. Each fabric, prior to use, was scoured with a standard synthetic detergent to remove all finishing agents and sizes.

The above described adhesive dispersion of epoxidized ethylene/1,4-hexadiene copolymer latex and the dispersion of the heat reactive resorcinol/formaldehyde resins were coated on the scoured nylon and rayon filament fabrics. Drying was carried out for 20 minutes in a circulating air oven maintained at 135° C. or alternatively for 30 minutes in a vacuum oven at 100° C.

The coated fabric is then pressed against the 80-mil thick sheet of the compounded α-olefin hydrocarbon elastomer. A 3" x 1.5" piece of cellophane was placed at one end of the elastomer to facilitate subsequent separation of the elastomer and the fabric for testing. The elastomer was supported on the back by a 3" x 6" piece of 10 oz. cotton duck to provide stability. The assembly was cured at 160° C. for 30 min. under a pressure of 200–250 lbs. per sq. in. A 1" x 6" strip was then cut from the center of the pad. The peel adhesion of the fabric in this sample was determined on an Instron tester by measuring the force necessary to separate the fabric from the elastomer at a head speed of 2" per minute.

The table which follows shows the peel adhesion data in lbs. per linear inch at 25° C. In most of the illustrations the composition of the present invention was blended with a commercial styrene/1,3-butadiene/2-vinyl pyridine copolymer latex having 41% by weight solids and commercially available from General Tire & Rubber Co. as "Gen-Tac." In several instances the "Gen-Tac" latex was used alone for purposes of comparison; these instances are outside the scope of the present invention. All dispersions are of type X described in paragraph D above.

TABLE 2

| Fabric | Latex Solids | | | | Peel Adhesion |
|---|---|---|---|---|---|
| | Epox. Copoly. | Percent Epox. Copoly. | Percent "Gen-Tac" | Percent Disp.¹ on fabric | |
| Rayon | None | ² 0 | 100 | 12 | 20 |
| Do | B-2 | 50 | 50 | 15 | 36 |
| Nylon | B-2 | 50 | 50 | 9 | 24 |
| Do | A+B | 24 | 76 | 9 | 31 |
| Do | A+B | 51 | 49 | 10 | 29 |
| Do | A+B | 75 | 25 | 10 | 23 |
| Do | A-1 | 50 | 50 | 5 | 26 |
| Do | A-2 | 50 | 50 | 5 | 25 |
| Do | A-4 | 50 | 50 | 5 | 25 |
| Do | A-5 | 50 | 50 | 7 | 27 |
| Do | A-6 | 50 | 50 | 9 | 25 |
| Do | None | ² 0 | 100 | 7 | 11 |

¹ Gain in weight based on weight of unsaturated fabric.
² Outside scope of invention.

G. *Adhesion of tire cord to α-olefin hydrocarbon copolymer*

The nylon tire cord was type T-714 (commercially available from Du Pont). The rayon tire cord was type 272. The nylon and rayon tire cords were coated by continuously running them through the coating compositions indicated hereafter at the rate of about 3 feet per minute and then through a 2-foot column where they were contacted with a stream of air heated to about 135° C.

The coated tire cord samples were then used to conduct "single-cord adhesion" tests or "H-pull tests" at 25° C. and 100° C. as described in India Rubber World, 114, 213–217 (1946). The coated cord samples were molded (as described in the reference) into the sulfur-curable ethylene hydrocarbon elastomer which had been compounded as described above. Then the assemblies were cured for 40 minutes at 160° C. under a pressure of 550 p.s.i., starting with the mold at room temperature. The results are listed in Table 3; adhesion data are in lbs./cord. The first four tests were performed on rayon cord whereas all the remaining tests were performed on nylon cord. All of the epoxidized copolymers employed were those identified in Table 1 above and are so indicated. All the tests using epoxidized copolymer B-1 and the first two controls were employed in a dispersion of type Y described in paragraph D; all of the remaining tests were made using a dispersion of type X.

TABLE 3.—ADHESION OF TIRE CORDS TO α-OLEFIN HYDROCARBON ELASTOMER STOCK

| Epoxy. Copoly. | Percent Epoxy. Copoly. | Percent "Gen-Tac" | Percent Disp.¹ on Cord | H-Pull 25° C. | Adhesion 100° C. |
|---|---|---|---|---|---|
| None | ² 0 | 100 | 5 | 11 | 8.5 |
| B-1 | 25 | 75 | 5 | 14 | 9 |
| B-1 | 50 | 50 | 9 | 15 | 11 |
| B-1 | 75 | 25 | 9 | 16 | 11 |
| None | ² 0 | 100 | 5 | 12.5 | 9 |
| B-1 | 25 | 75 | 5 | 14.5 | 10 |
| B-1 | 50 | 50 | 5 | 15.5 | 10.5 |
| B-1 | 75 | 25 | 8 | 17.5 | 10.5 |
| None | ² 0 | 100 | 7 | 10.5 | 7.5 |
| A-3 | 20 | 80 | 6 | 14.5 | 9 |
| A-3 | 33 | 67 | 6 | 17 | 10 |
| A-3 | 50 | 60 | 6 | 17.5 | 10.5 |
| A-7 | 33 | 67 | 5 | 15 | 10.5 |
| A-7 | 50 | 50 | 5 | 16 | 12 |
| A-1 | 50 | 50 | 8 | 14.5 | 10 |
| A-2 | 50 | 50 | 9 | 15 | 10.5 |
| A-4 | 50 | 50 | 6 | 13.5 | 9.5 |
| A-5 | 50 | 50 | 6 | 16 | 10 |
| A-6 | 50 | 50 | 7 | 13.5 | 9.5 |

¹ Gain in weight based on weight of untreated cord.
² Outside scope of invention for comparison only.

As previously described various other copolymers of ethylene and non-conjugated hydrocarbon dienes may be epoxidized and employed in adhesive compositions in the same manner as set forth in the above examples.

As can be seen from the results listed above, substantial increases of adhesive strength can be obtained when the novel compositions of the present invention are used to adhere an olefin hydrocarbon to important fabrics as rayon and nylon as well as tire cords. As indicated by the results optimum adhesion may be obtained through proper variation of the adhesive composition.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A process for firmly adhering a sulfur-curable, chain-saturated α-olefin hydrocarbon polymer to a substrate selected from the group consisting of solid polyamide and cellulosic substrates comprising coating said substrate with an aqueous dispersion containing (a) an epoxidized α-olefin/non-conjugated diene copolymer having at least about 0.3 gram-mole of oxirane groups and at least about 0.3 gram-mole of carbon-carbon double bonds per kilogram of copolymer, and (b) a phenol-formaldehyde resin, drying the coating, and thereafter curing the hydrocarbon copolymer while pressing it in contact with the coated substrate.

2. A process as defined in claim 1 wherein said sulfur-curable, chain-saturated, α-olefin hydrocarbon copolymer is a copolymer of ethylene, propylene and a non-conjugated diene.

3. A process as defined in claim 1 wherein (a) is an epoxidized copolymer of ethylene, and a non-conjugated hydrocarbon diene of 6 to 22 carbon atoms.

4. A process for firmly adhering a sulfur-curable chain-saturated α-olefin hydrocarbon copolymer to a substrate selected from the group consisting of polyamide and cellulosic substrates, comprising coating the substrate with an aqueous composition containing a resorcinol-formaldehyde resin, drying said coating, and thereafter applying an aqueous adhesive composition containing an epoxidized α-olefin/non-conjugated diene copolymer having at least about 0.3 gram-mole oxirane groups and at least 0.3 gram-mole carbon-carbon double bonds per kilogram of copolymer.

5. The adhered composite article prepared by the process of claim 1.

6. An adhesive composition suitable for bonding sulfur-curable, chain-saturated hydrocarbon copolymers to polyamide or cellulosic substrates which comprises an aqueous dispersion of (a) an epoxidized α-olefin/non-conjugated diene copolymer having at least about 0.3 gram-mole oxirane groups and 0.3 gram-mole carbon-carbon double bonds per kilogram of copolymer, and (b) a resorcinol-formaldehyde resin.

7. An epoxidized copolymer of an α-olefin hydrocarbon and a non-conjugated hydrocarbon diene having at least from 6 to 22 carbon atoms wherein said copolymer has originally from about 2 to 3 moles of carbon-carbon double bonds per kilogram of copolymer and in which about 10 to 90% of said double bonds have been oxidized to oxirane groups.

8. The composition of claim 7 in which the epoxidized α-olefin hydrocarbon/non-conjugated hydrocarbon diene copolymer is a copolymer of ethylene and 1,4-hexadiene.

References Cited
UNITED STATES PATENTS

| | | | |
|---|---|---|---|
| 3,116,164 | 12/1963 | Miller et al. | 260—29.3 |
| 3,194,294 | 7/1965 | Gils | 260—29.3 |
| 3,242,118 | 3/1966 | St. Clair et al. | 260—29.3 |
| 3,262,482 | 7/1966 | Clifton et al. | 260—29.3 |

MURRAY TILLMAN, *Primary Examiner.*

J. T. GOOLKASIAN, *Assistant Examiner.*